(12) United States Patent
Manousos et al.

(10) Patent No.: US 8,250,034 B2
(45) Date of Patent: Aug. 21, 2012

(54) METHOD AND APPARATUS TO PROVIDE VISUAL EDITING

(75) Inventors: Nicholas H. Manousos, Santa Cruz, CA (US); R. Travis Atkins, Santa Cruz, CA (US); Abhishek Tiwari, Santa Cruz, CA (US); Eric O. Bodnar, Santa Cruz, CA (US)

(73) Assignee: Verisign, Inc., Reston, VA (US)

( * ) Notice: Subject to any disclaimer, the term of this patent is extended or adjusted under 35 U.S.C. 154(b) by 837 days.

(21) Appl. No.: 11/106,203

(22) Filed: Apr. 13, 2005

(65) Prior Publication Data

US 2005/0235212 A1 Oct. 20, 2005

Related U.S. Application Data

(60) Provisional application No. 60/562,351, filed on Apr. 14, 2004.

(51) Int. Cl.
*G06F 17/30* (2006.01)

(52) U.S. Cl. ........ 707/638; 707/899; 707/802; 715/255; 715/723

(58) Field of Classification Search .................. 715/765, 715/810, 202, 723, 523, 255; 707/203, 638, 707/802, 999.203
See application file for complete search history.

(56) References Cited

U.S. PATENT DOCUMENTS

| | | | |
|---|---|---|---|
| 4,408,200 A | 10/1983 | Bradley | |
| 4,451,824 A | 5/1984 | Thayer et al. | |
| 5,404,316 A * | 4/1995 | Klingler et al. | 715/723 |
| 5,467,441 A * | 11/1995 | Stone et al. | 345/619 |
| 5,469,536 A * | 11/1995 | Blank | 345/594 |
| 5,666,503 A * | 9/1997 | Campanelli et al. | 715/853 |
| 5,675,358 A * | 10/1997 | Bullock et al. | 345/420 |
| 5,682,326 A * | 10/1997 | Klingler et al. | 715/202 |
| 5,751,613 A | 5/1998 | Doty et al. | |
| 5,844,542 A * | 12/1998 | Inoue et al. | 345/594 |
| 5,889,519 A * | 3/1999 | Boezeman et al. | 715/723 |
| 5,940,077 A | 8/1999 | Amro | |
| 6,025,827 A | 2/2000 | Bullock et al. | |
| 6,028,603 A | 2/2000 | Wang et al. | |
| 6,070,167 A * | 5/2000 | Qian et al. | 707/102 |

(Continued)

FOREIGN PATENT DOCUMENTS

WO WO 95/01219 5/1995

OTHER PUBLICATIONS

Tzi-cker Chiueh, Tulika Mitra, Anindya Neogi, Chuan-Kai Yang; Zodiac: A history-based interactive video authoring system; Oct. 2000; Springer Berlin / Heidelberg; Multimedia Systems vol. 8, No. 3; pp. 201-211.*

(Continued)

*Primary Examiner* — Baoquoc N To
(74) *Attorney, Agent, or Firm* — Blakely, Sokoloff, Taylor & Zafman LLP; Judith A. Szepesi (57) ABSTRACT

A method to display a series of media objects containing one or more media objects is described. The method includes receiving a request to edit a media object, creating a new copy of the media object in response to the request, and applying the edit to the new copy of the media object. The method further includes for providing images associated with each of a series of edits applied to a media object.

20 Claims, 6 Drawing Sheets

U.S. PATENT DOCUMENTS

| | | | | |
|---|---|---|---|---|
| 6,161,115 A * | 12/2000 | Ohanian | | 715/203 |
| 6,188,400 B1 | 2/2001 | House et al. | | |
| 6,195,101 B1 * | 2/2001 | Ghislain Bossut et al. | | 345/629 |
| 6,201,548 B1 * | 3/2001 | Cariffe et al. | | 345/620 |
| 6,202,073 B1 * | 3/2001 | Takahashi | | 715/204 |
| 6,204,840 B1 * | 3/2001 | Petelycky et al. | | 715/202 |
| 6,260,040 B1 * | 7/2001 | Kauffman et al. | | 707/10 |
| 6,304,271 B1 * | 10/2001 | Nehme | | 345/620 |
| 6,389,592 B1 * | 5/2002 | Ayres et al. | | 717/172 |
| 6,470,349 B1 | 10/2002 | Heninger et al. | | |
| 6,527,812 B1 * | 3/2003 | Bradstreet | | 715/210 |
| 6,538,667 B1 | 3/2003 | Duursma et al. | | |
| 6,600,869 B1 * | 7/2003 | Chen et al. | | 386/52 |
| 6,686,918 B1 * | 2/2004 | Cajolet et al. | | 345/473 |
| 6,714,219 B2 | 3/2004 | Lindhorst et al. | | |
| 6,714,928 B1 | 3/2004 | Calow | | |
| 6,750,890 B1 * | 6/2004 | Sugimoto | | 715/838 |
| 6,844,885 B2 * | 1/2005 | Anderson et al. | | 345/650 |
| 6,883,140 B1 * | 4/2005 | Acker et al. | | 715/730 |
| 7,062,497 B2 * | 6/2006 | Hamburg et al. | | 707/101 |
| 7,142,225 B1 * | 11/2006 | Boler et al. | | 345/619 |
| 7,149,755 B2 | 12/2006 | Obrador | | |
| 7,290,220 B2 | 10/2007 | Bhogal et al. | | |
| 7,336,264 B2 * | 2/2008 | Cajolet et al. | | 345/173 |
| 7,441,182 B2 * | 10/2008 | Beilinson et al. | | 715/229 |
| 2001/0021935 A1 | 9/2001 | Mills | | |
| 2002/0047856 A1 | 4/2002 | Baker | | |
| 2002/0103897 A1 | 8/2002 | Rezvani et al. | | |
| 2002/0124076 A1 | 9/2002 | Lindstrom-Tamer | | |
| 2002/0140740 A1 * | 10/2002 | Chen | | 345/810 |
| 2002/0156815 A1 | 10/2002 | Davia | | |
| 2002/0167546 A1 * | 11/2002 | Kimbell et al. | | 345/790 |
| 2003/0005333 A1 | 1/2003 | Noguchi et al. | | |
| 2003/0023632 A1 | 1/2003 | Ries et al. | | |
| 2003/0023674 A1 | 1/2003 | Hildebrand | | |
| 2003/0028543 A1 * | 2/2003 | Dusberger | | 707/100 |
| 2003/0033296 A1 | 2/2003 | Rothmuller et al. | | |
| 2003/0074484 A1 | 4/2003 | Cheng et al. | | |
| 2003/0074634 A1 | 4/2003 | Emmelmann | | |
| 2003/0103060 A1 * | 6/2003 | Anderson et al. | | 345/619 |
| 2003/0105795 A1 * | 6/2003 | Anderson et al. | | 709/101 |
| 2003/0188262 A1 | 10/2003 | Maxwell et al. | | |
| 2003/0217104 A1 | 11/2003 | Hamdan et al. | | |
| 2003/0220892 A1 | 11/2003 | Hand et al. | | |
| 2003/0225764 A1 | 12/2003 | Smith et al. | | |
| 2004/0054966 A1 | 3/2004 | Busch et al. | | |
| 2004/0066410 A1 | 4/2004 | Lindhorst et al. | | |
| 2004/0070619 A1 * | 4/2004 | Yoshio et al. | | 345/764 |
| 2004/0078761 A1 * | 4/2004 | Ohanian | | 715/530 |
| 2004/0169681 A1 * | 9/2004 | Van Kesteren et al. | | 345/764 |
| 2004/0196314 A1 | 10/2004 | Bhogal et al. | | |
| 2004/0199543 A1 | 10/2004 | Braud et al. | | |
| 2004/0199861 A1 | 10/2004 | Lucovsky | | |
| 2004/0205488 A1 | 10/2004 | Fry | | |
| 2004/0217985 A9 | 11/2004 | Ries et al. | | |
| 2004/0226027 A1 | 11/2004 | Winter | | |
| 2005/0049968 A1 | 3/2005 | Porter | | |
| 2005/0154982 A1 | 7/2005 | Berg | | |
| 2005/0226530 A1 * | 10/2005 | Murayama | | 382/276 |
| 2005/0234838 A1 | 10/2005 | Manousos et al. | | |
| 2005/0234981 A1 | 10/2005 | Manousos et al. | | |
| 2006/0248472 A1 * | 11/2006 | Helie et al. | | 715/810 |
| 2007/0157102 A1 * | 7/2007 | Hasegawa et al. | | 715/769 |
| 2007/0186157 A1 * | 8/2007 | Walker et al. | | 715/530 |
| 2008/0072139 A1 | 3/2008 | Salinas et al. | | |

OTHER PUBLICATIONS

Xu Xianghua; Bu Jiajun; Chen Chun; Li Yong, "Group undo framework and algorithms in real-time collaborative image editing systems," Systems, Man and Cybernetics, 2003. IEEE International Conference on , vol. 3, No., pp. 2187-2192 vol. 3, Oct. 5-8, 2003.*

Seitz, Steven M., et al., "Plenoptic Image Editing", International Journal of Computer Vision, vol. 48, No. 2, Jul. 2002, pp. 115-129.*

Barrett, William A., et al., "Object-based Image Editing", Proc. of the 29th Annual Conf. on Computer Graphics and Interactive Techniques, San Antonio, TX, Jul. 23-26, 2002, pp. 777-784.*

Boust, Clotilde, et al., "Color Correction Judgements of Digital Images by Experts and Naïve Observers", Digital Photography Conf., IS&T PICS 2003, Rochester, NY, May 13, 2003, pp. 4-8.*

Speegle, Greg, et al., "A Meta-Structure for Supporting Multimedia Editing in Object-Oriented Databases", BNCOD 16, Cardiff, Wales, UK, Jul. 6-8, 1998, pp. 89-102.*

Microsoft Computer Dictionary, 5th Edition, Microsoft Press, Redmond, WA, © 2002, pp. 260 and 564.*

"Ulead PhotoImpact 3.0 User Guide", Ulead Systems, Inc. Torrance, CA, Jan. 1996, pp. 77-82, 88-92, 98-101, 104-114, 126-130, 141-148, 155-160 and 167-172.*

Edwards, W. Keith, et al., "A Temporal Model for Multi-Level Undo and Redo", UIST '00, San Diego, CA, © 2000, pp. 31-40.*

Brinck, Tom, et al., "Building Shared Graphical Editors Using the Abstraction-Link-View Architecture", ECSCW '93, Milan, Italy, Sep. 13-17, 1993, pp. 311-324.*

Chen, David, et al., "Undoing Any Operation in Collaborative Graphics Editing Systems", Group '01, Boulder, CO, Sep. 30-Oct. 3, 2001, pp. 197-206.*

Ueda, Hirotada, et al., "Automatic Structure Visualization for Video Editing", INTERCHI '93, Apr. 24-29, 1993, pp. 137-141 and 545-546.*

Kurlander, David Joshua, "Graphical Editing by Example", Columbia Univ. Computer Science Dept. Technical Report CUCS-023-93, Columbia University, Jul. 1993, 234 pages.*

Wu, D. M., et al., "A Distributed Real-time Image Processing System", Real-Time Imaging, vol. 1, Issue 6, Dec. 1995, pp. 427-435.*

Girgensohn, Andreas, et al., "Home Video Editing Made Easy—Balancing Automation and User Control", Human-Computer Interaction, INTERACT '01, © 2001, pp. 464-471.*

Kurlander, David, et al., "Editable Graphical Histories", IEEE Workshop on Visual Languages, Pittsburgh, PA, Oct. 10-12, 1988, pp. 127-134.*

Kohntopp, Kristian, "Von HTML zu PHP: Schreibe Formularverarbeitungen in Normalforrn", Aug. 2003, http:/web.archive.org/web/20030810025438/http://www.php-faq.de/q/q-stilnormalform.html.

Taylor, Andrew, et al., "Javascript function to submit form?", Sep. 2001, http://groups.google.de/group/comp.lang.javascript/browse_thread/thread/cb8897df08750c2c/94b30a3ace936bd0?lnk=si&q=javascript+onechange+submit+form&mum=1&hl=de#94b30a3ace936bd0.

PCT International Search Report for PCT/US2005/012773 (3 pgs).

"DIG35-Metadata for Digital Images Annex C: Content Description Metadata" Digital Imaging Group, Mar. 2000, p. 44-57.

PCT International Search Report for PCT/US2005/012772.

PCT International Search Report for PCT/US2005/012771.

PhotoMesa Screenshots, from Internet Archive Wayback Machine, http://www.web.archive.org/web/*/http://www.windsorinterfaces.com/photomesa.shtml , 3 pgs.

Bederson, Benjamin B., "Quantum Treemaps and Bubblemaps for a Zoomable Image Browser," University of Maryland, College Park, MD, pp. 1-10.

Rice, James, et al., "Using the Web Instead of a Window System", 1996, ACM Press, New York, NY, USA, Conference on Human Factors in Computing Systems, pp. 103-110.

Maurer, Frank, "Engineering Web Applications with Java", 2002, Encyclopedia of Software Engineering, "Section 4: Application Tier Technologies", 3 pgs.

PCT/US/05/12773, International Preliminary Report, Jan. 30, 2008, 7 pages.

PCT/US/05/12773, International Preliminary Report, Mar. 28, 2008, 6 pages.

Hurwitz, Dan, et al., "Programming ASP.NET," ISBN 0-596-00171-1, Feb. 2002, 32 pages.

Bederson, Benjamin B, "PhotoMesa: A Zoomable Image Browser Using Quantum Treemaps and Bubblemaps," ACM, 2000, pp. 71-80.

Grundy, John, et al, "Building Multi-Device, Component-Based, Thin-Client Groupware: Issues and Experiences," Australian Computer Science Communications, vol. 24, Issue 4, Jan./Feb. 2002, pp. 71-80.

Moss, Julian, "Understanding TCP/IP," PC Network Advisor, Issue 91, Jan 1998, pp. 13-16.

EP Application No. 05735219.7, Office Action dated Sep. 25, 2007, 5 pages.
EP Application No. 05735212.2, Office Action dated Sep. 2, 2008, 4 pages.
EP Application No. 05735212.2, Office Action dated Jan. 5, 2011, 6 pages.
EP Application No. 05735221.3, Office Action dated Sep. 2, 2008, 5 pages.
EP Application No. 05735221.3, Office Action dated Jan. 5, 2011, 7 pages.
Fox, Armando, et al, "Integrating Information Appliances into an Interactive Workspace", IEEE Computer Graphics and Applications, vol. 20, Issue 3, May/Jun. 2000, pp. 54-65.
Kindberg, Tim, et al, "A Web-based nomadic computing system", Computer Networks, vol. 35, Issue 4, Mar. 2001, pp. 443-456.

* cited by examiner

METHOD AND APPARATUS TO PROVIDE VISUAL EDITING

RELATED APPLICATIONS

The present application claims the benefit of U.S. Provisional Patent Application Ser. No. 60/562,351, filed Apr. 14, 2004, and incorporates that application by reference.

FIELD OF THE INVENTION

The present invention relates to media objects, and more particularly to editing media objects.

BACKGROUND

Users often edit digital photographs or videos. In general, the process is as follows. The user opens a digital photograph. The user then has the ability to apply various edits to the photograph. These edits include changing the colors, changing the texture, making corrections, actually editing the photograph, or making other changes. As the user applies each change, the photograph changes. Some editing tools permit the user to undo each of the edits that have been applied.

SUMMARY OF THE INVENTION

A method and apparatus for providing images associated with each of a series of edits applied to a media object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus to provide visual feedback for each of a series of edits of a media object is described.

Figure 1:
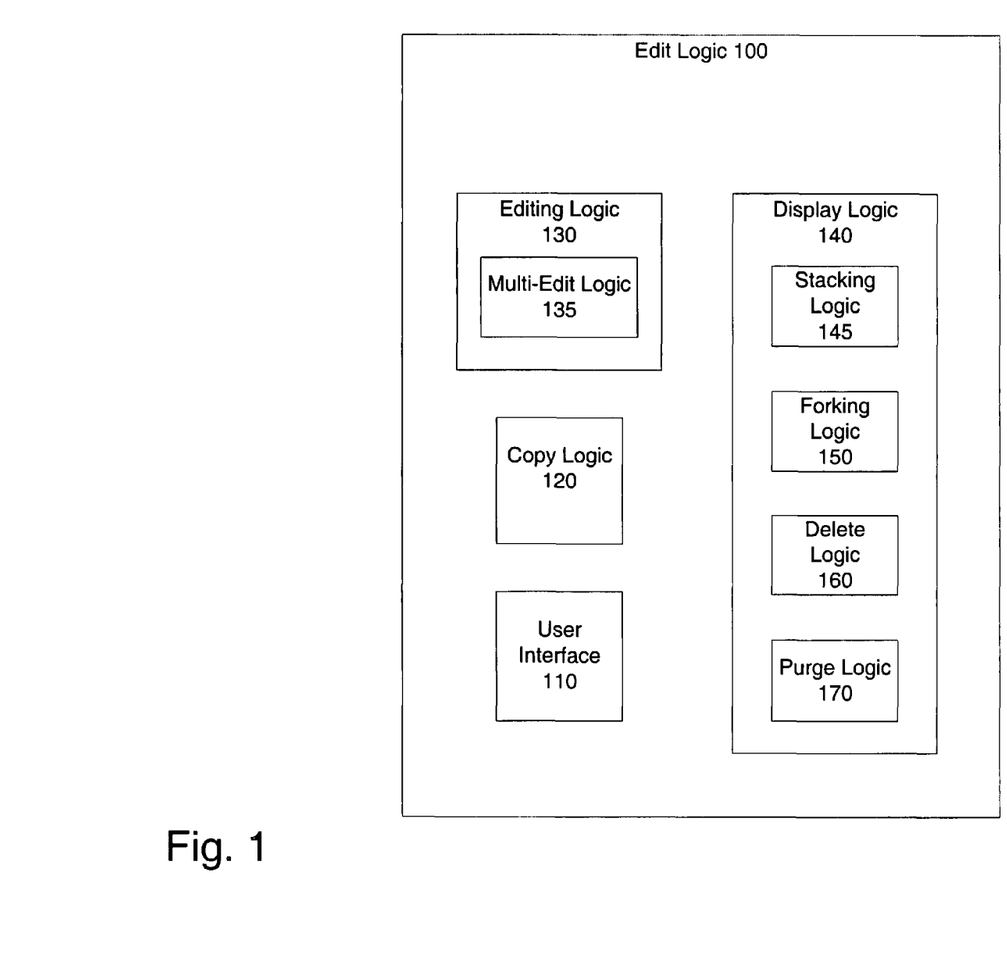
FIG. 1 is a block diagram of one embodiment of an editing logic.

FIG. 1 is a block diagram of one embodiment of an edit logic 100. User interface 110 receives user interaction data, which enables the user to interact with edit logic 100. In one embodiment, edit logic 100 resides on a client system. In another embodiment, edit logic 100 has its functions split between a client and a server. In another embodiment, edit logic 100 resides on a server system, and the user interacts with the edit logic 100 using an application such as a browser. A browser is any application and/or program that supports HTML (Hypertext Markup Language) or another mark-up type language, and is capable of accessing a server. The server, in one embodiment, may be on the same computer as the browser. In another embodiment, the browser's system may be coupled to the server via a network. The network, in one embodiment, may be the Internet, a local area network, a wide area network, or any other type of connection between computers.

Copy logic 120 generates one or more copies of the media object selected for editing. Editing logic 130 then enables the user to perform any available editing functions. Editing functions for photographs, for example, can include color changes, rotation, cropping, red eye removal, texture changes, and any other editing that can be implemented. Multi-edit logic 135 enables the editing logic 130 to generate multiple edits. For example, a multi-edit may be to crop an image in various ways, for example to the various photograph sizes. Another multi-edit may be to change the color tones in various ways. Another multi-edit may be to generate an image with each of the available textures. The multi-edit logic 135 automatically generates multiple versions of the media object, each with a different edit applied.

Display logic 140 adds the edited copy or copies of the media objects to the series of media objects that make up the edits that have been applied to date. In one embodiment, the series starts with a current media object, and is added to each time a new edit is applied.

In one embodiment, the series is displayed in a stack. A stack is a collection of objects laid on top of each other. In one embodiment, the stack makes visible at least a small portion of each of the objects within the stack. The term "heap" may be used, in one embodiment, to refer to a collection of stacks. In one embodiment, the heap makes visible at least a small portion of each stack within the heap. In one embodiment, the stacking logic 145 is implemented as described in U.S. patent application Ser. No. 11/105,872, filed on the same date as the present application, entitled "Method and Apparatus for Creating, Assembling, and Organizing Compound Media Objects," now U.S. Pat. No. 7,739,306 and may be used to generate the stack.

Forking logic 150 enables the system to edit an image in the series that is not the current image. If the user selects a non-current image to edit, forking logic 150 creates a different fork, using the selected non-current image as the "original image." In one embodiment, "forks" may be shown as different stacks. In another embodiment, forks may be shown as a series of images, as illustrated in FIGS. 3C and 3D.

Delete logic 160 enables a user to delete one or more media objects from the series. Purge logic 170 removes the edits associated with those images from the series. This is explained in more detail below with respect to FIGS. 3A and 3B.

Figure 2:
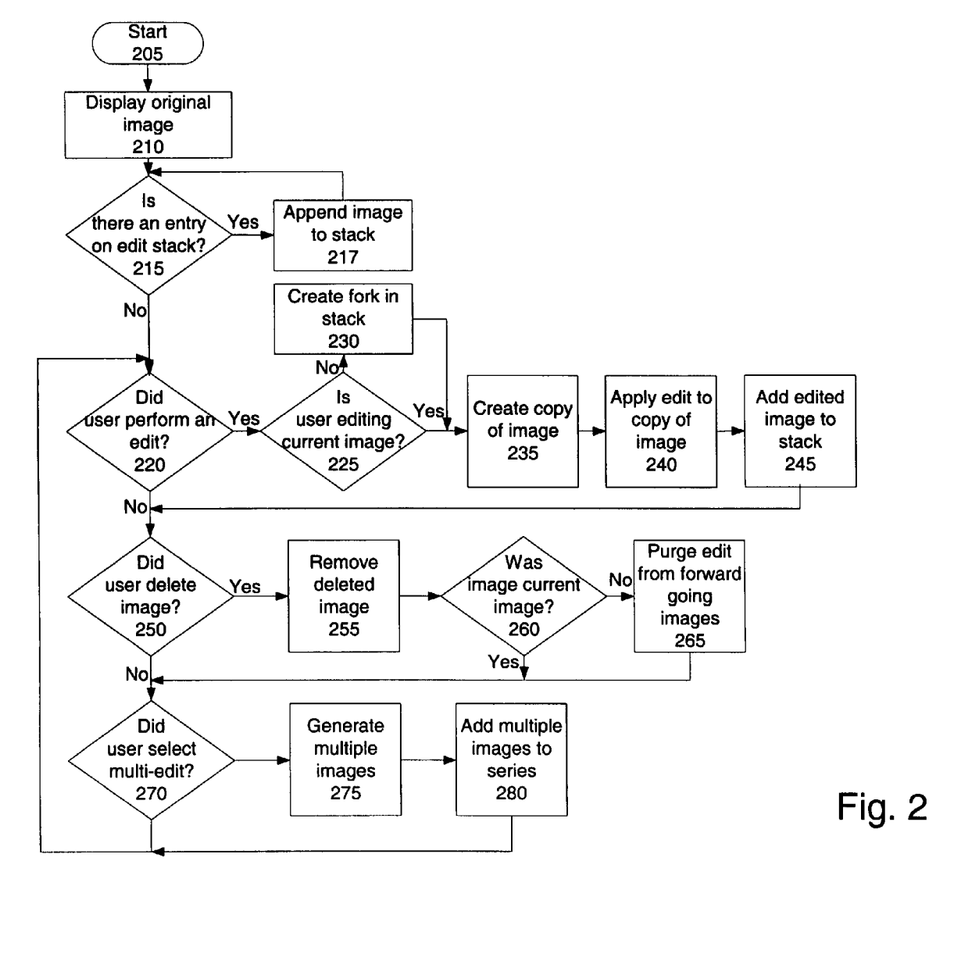
FIG. 2 is a flowchart of one embodiment of using the editing logic.

FIG. 2 is a flowchart of one embodiment of using the editing logic. The process starts at block 205.

At block 210, the original image is displayed. In one embodiment, the original image may be a current image in a stack. In another embodiment, the user selects a single image to serve as the "original image." The "top" image which is the result of all foregoing edits is labeled the "current image." In another embodiment, at block 215, the process determines whether there are any current entries in the edit stack. In one embodiment, the user opens an existing edit stack for editing. If there are entries in the edit stack, at block 217, the process places the entry from the edit stack on the current stack (initially, only the original image). The process then returns to block 215. This process is iterated until all of the entries from the edit stack have been placed on the current stack. The process then continues to block 220, to enable further editing by the user.

At block 220, the process determines whether the user performed an edit. In one embodiment, the user indicates that he or she wishes to perform an edit by clicking an "Edit" button or similarly interacting with the system.

If the user selected editing, the process continues to block 225. Otherwise, the process continues to block 250.

At block 225, the process determines whether the user is editing the current image. In one embodiment, the user may choose to make alterations to an image at any point in the series. In one embodiment, a parallel fork is created, at block 230, if the user chooses to edit an image that is not the current image. In another embodiment, the system may delete all media objects which are in front of the media object selected for editing. The process then returns to block 235.

For example, there are media objects 1, 2, 3, and 4 in that order, with 1 being the original image and 4 being the current image. In one embodiment, when the user selects media object 3, a new media object 3' is created with these edits. Thus, two "current" images exist which may be edited, 3' and 4. In another embodiment, when the user selects media object 3, media object 4 is deleted & a new media object 4' is created, with the newly applied edits.

If the user is editing the current image, at block 225, the process continues directly to block 235.

At block 235, the system creates a copy of the media object. At bock 240, the user can apply edits to the copy of the media object. At block 245, the edited media object is placed on top of the series, and designated the "current image." The process then continues to block 250.

At block 250, the process determines whether the user selected an image deletion. If the user deleted an image, the process continues to block 255. At block 255, the deleted image is removed from the series. At block 260, the process determines whether the deleted image was the current image. If so, the process continues to block 270. If the deleted image was not the current image, at block 265 the edits associated with the deleted image are removed. As shown in FIGS. 3A-D, in one embodiment, each subsequent media object in the series includes all foregoing edits. Thus, if the user deletes image 3, then image 4 is modified to remove the effects of the edit associated with image 3. The process then returns to block 270.

At block 270, the process determines whether the user selected a multi-edit. If so, the process continues to block 275. At block 275, the process generates multiple versions of the media object, each with a different edit applied. For example, the user may select the edit "multi-edit textures." The system may in response generate four images, each having a different texture applied to them. These images, at block 280, are placed on the stack.

The process then returns to block 220, to enable user to perform further edits. In one embodiment, the user may terminate the process at any time by selecting "end editing" or a similar function.

Note that while FIG. 2 discusses "images" this process may be applied to any media objects, such as photographs, animations, images, videos, audio files, etc.

Figure 3A:
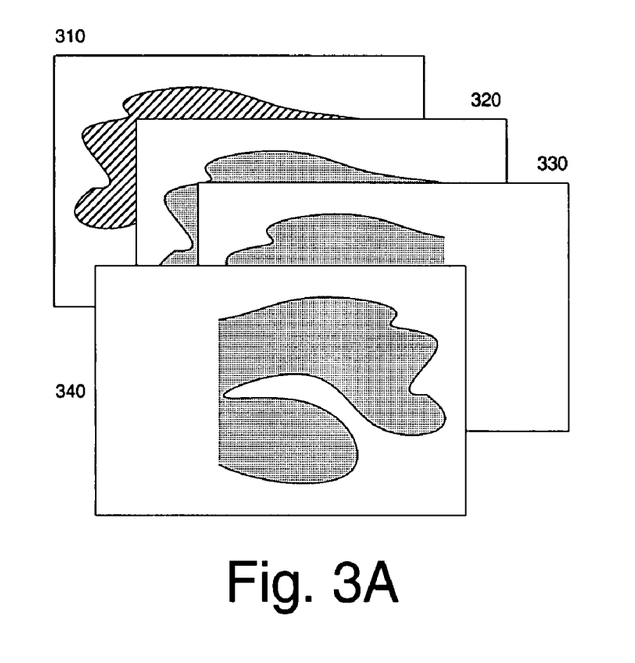
FIGS. 3A and 3B illustrate one embodiment of visual editing.
Figure 3B:
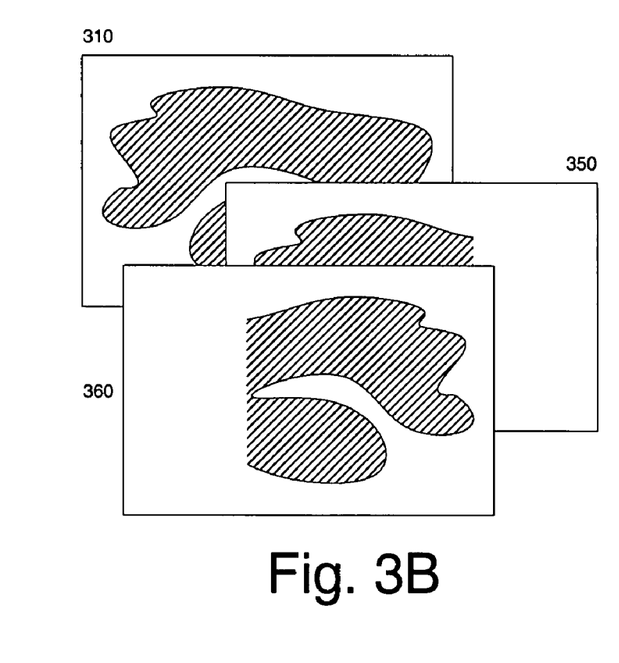
Figure 3C:
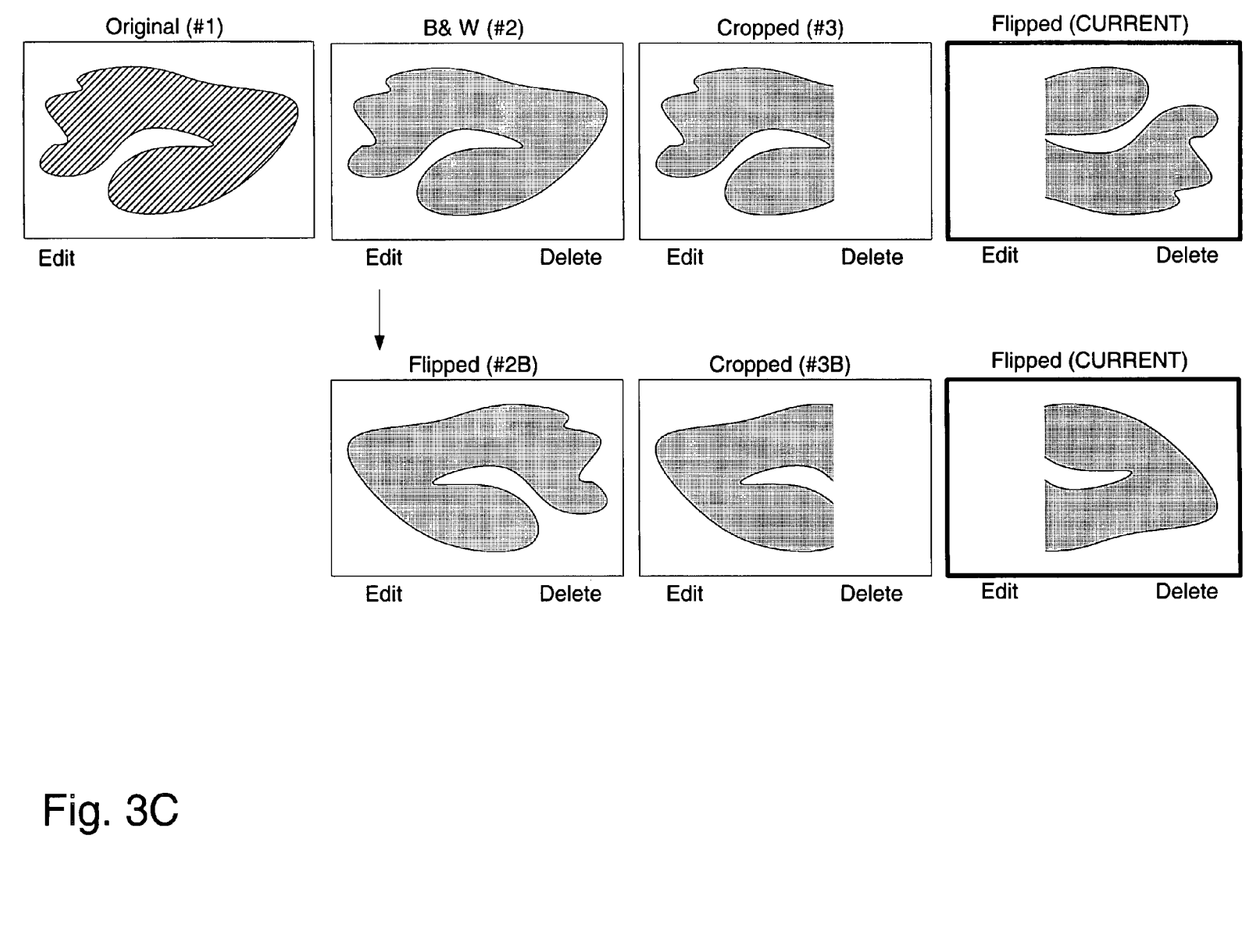
FIGS. 3C and 3D illustrate another embodiment of visual editing.
Figure 3D:
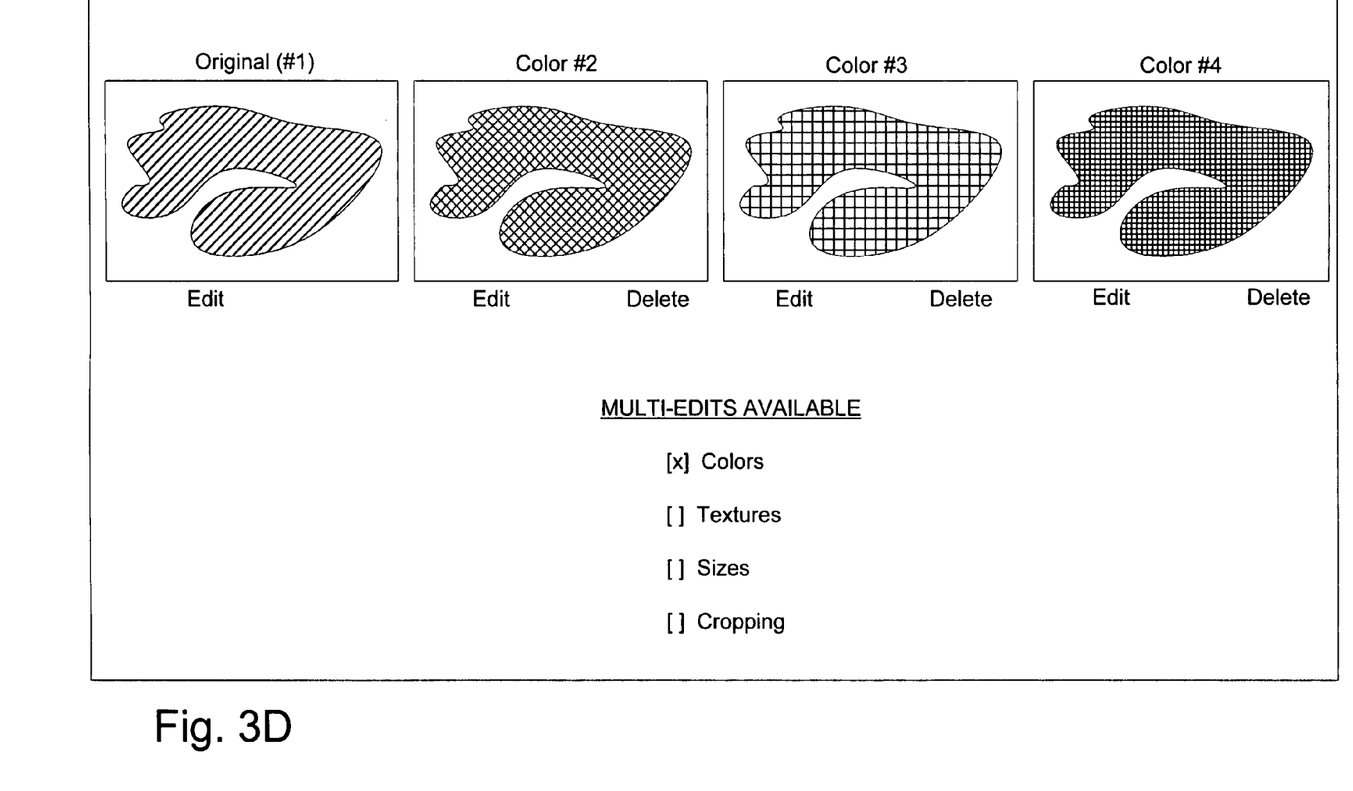

FIGS. 3A and 3B illustrate one embodiment of filter—stacking. In one embodiment, when an editing tool is applied to an item on the stack, the newly created/edited item is placed on top of the stack, with the unedited version saved on the stack as well.

In one embodiment, the user may select "spectrum edit" for certain editing formats, such as applying filters. The system then automatically applies filters at various strengths, and places all of the variations on the stack. In one embodiment, the system may apply four strengths of the filter. The user then may click through the filtered versions on the stack, delete any he or she does not wish to save, and have the original, as well as all of the various filter strengths available.

In one embodiment, filters may be applied serially. This is shown in FIGS. 3A and 3B. That is, the user may apply a filter, and the filtered media object is placed on the stack. A subsequent filter is applied to the (already filtered) media object on top of the stack. Thus, the user may sequentially create a media object that has numerous filters applied to it. In one embodiment, the user may delete one of the media objects in the stack, and the appropriate filtering disappears as well. For example, the user takes a first media object (media object #1 310), then applies a black & white filter to it. The black & white media object (media object #2 320) is now on top of the stack. The user then applies a crop, producing a black & white cropped media object (media object #3 330). The user then applies a media object reverse, producing media object #4 340 on the stack. Thus, the user ends up with a cropped, reversed, black & white media object (media object #4 340), as shown in FIG. 3A.

If the user then deletes the media object which applied the black & white filter (i.e. media object #2 320), the resultant media object (formerly media object #4 340, but now media object #3 360) is a cropped reversed media object that is no longer black & white.

FIGS. 3C and 3D illustrate another embodiment of visual editing. FIG. 3C illustrates one embodiment of forking. The process would generally start with original image (#1). In this example, the user changes the image to black and white, and thereby generates image B&W (#2). The user then crops the image, generated Cropped (#3). The user then flips the image generated Flipped Current#A.

At some point, after the generation of Cropped (#3), the user decides to edit the B&W image (#2). The user flips B&W (#2), generating Flipped (#2B). There are now two parallel forks, as can be seen. In one embodiment, the user may apply the same edits. In one embodiment, the system may automatically generate the edits downstream from the selected object.

The user may, in one embodiment, generate more forks, by selecting the edit of any of the images except the two Current Images, which would continue Fork one or Fork two.

Figure 4:
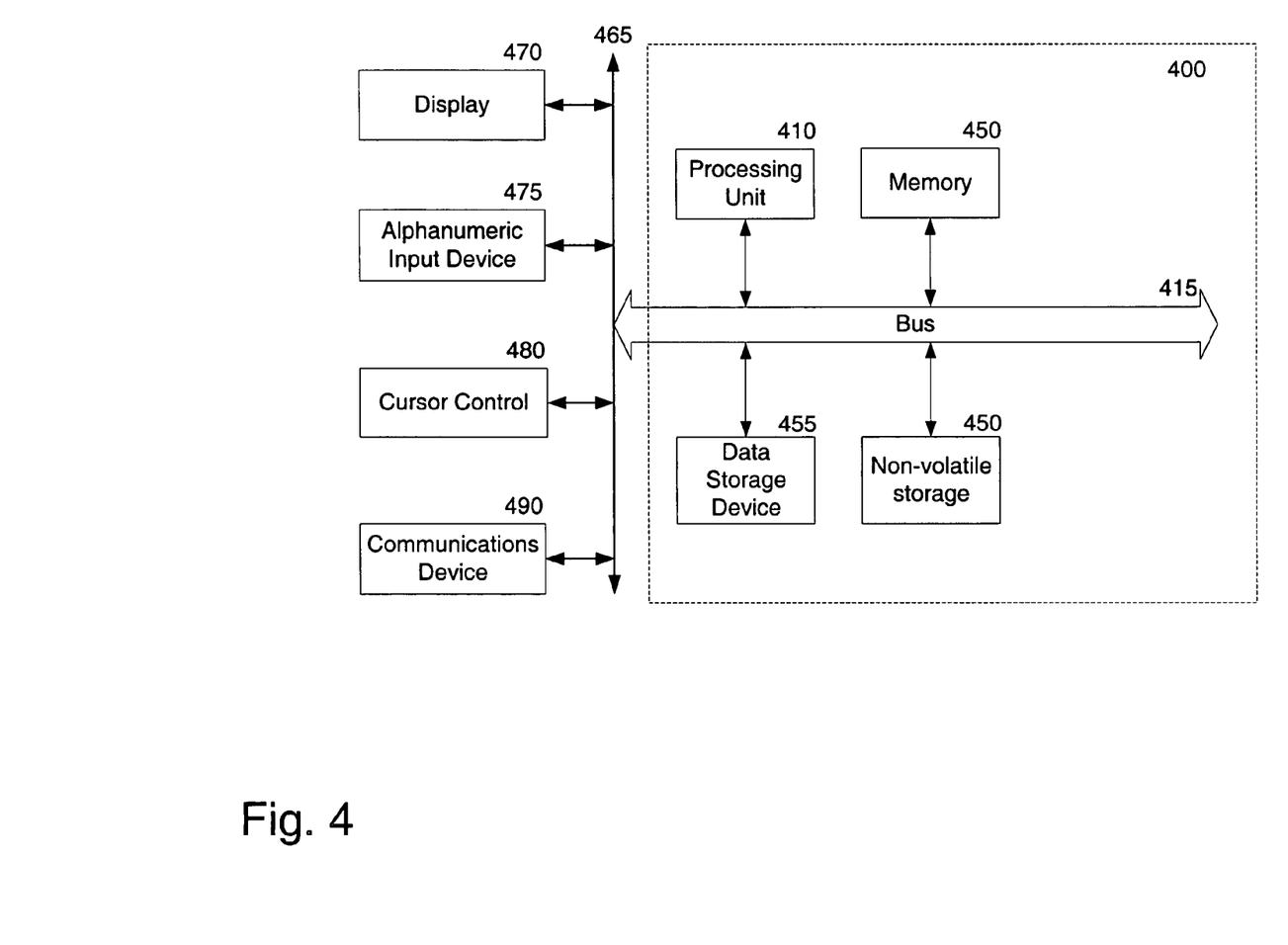
FIG. 4 is a block diagram of one embodiment of a computer system that may be used with the present invention.

FIG. 3D illustrates one embodiment of the multi-edit feature. The original image (Original #1) is selected. The user then selects a "multi-edit" feature. In one embodiment, multi-edit features include: color changes, rotation, cropping, red eye removal, texture changes, and any other editing that can be implemented in multiple ways. In one embodiment, when the user selects the multi-edit feature, he or she is presented with the set of options for multi-edit. In one embodiment, the user may select multiple multi-edits simultaneously. In one embodiment, these simultaneous multi-edits FIG. 4 is one embodiment of a computer system that may be used with the present invention. It will be apparent to those of ordinary skill in the art, however that other alternative systems of various system architectures may also be used.

The data processing system illustrated in FIG. 4 includes a bus or other internal communication means 415 for communicating information, and a processor 410 coupled to the bus 415 for processing information. The system further comprises a random access memory (RAM) or other volatile storage device 450 (referred to as memory), coupled to bus 415 for storing information and instructions to be executed by processor 410. Main memory 450 also may be used for storing temporary variables or other intermediate information during execution of instructions by processor 410. The system also comprises a read only memory (ROM) and/or static storage device 420 coupled to bus 415 for storing static information and instructions for processor 410, and a data storage device 425 such as a magnetic disk or optical disk and its corresponding disk drive. Data storage device 425 is coupled to bus 415 for storing information and instructions.

The system may further be coupled to a display device 470, such as a cathode ray tube (CRT) or a liquid crystal display (LCD) coupled to bus 415 through bus 465 for displaying information to a computer user. An alphanumeric input device 475, including alphanumeric and other keys, may also be coupled to bus 415 through bus 465 for communicating information and command selections to processor 410. An additional user input device is cursor control device 480, such as a mouse, a trackball, stylus, or cursor direction keys coupled to bus 415 through bus 465 for communicating direction information and command selections to processor 410, and for controlling cursor movement on display device 470.

Another device, which may optionally be coupled to computer system 400, is a communication device 490 for accessing other nodes of a distributed system via a network. The communication device 490 may include any of a number of commercially available networking peripheral devices such as those used for coupling to an Ethernet, token ring, Internet, or wide area network. The communication device 490 may further be a null-modem connection, or any other mechanism that provides connectivity between the computer system 400 and the outside world. Note that any or all of the components of this system illustrated in FIG. 4 and associated hardware may be used in various embodiments of the present invention.

It will be appreciated by those of ordinary skill in the art that any configuration of the system may be used for various purposes according to the particular implementation. The control logic or software implementing the present invention can be stored in main memory 450, mass storage device 425, or other storage medium locally or remotely accessible to processor 410.

It will be apparent to those of ordinary skill in the art that the system, method, and process described herein can be implemented as software stored in main memory 450 or read only memory 420 and executed by processor 410. This control logic or software may also be resident on an article of manufacture comprising a computer readable medium having computer readable program code embodied therein and being readable by the mass storage device 425 and for causing the processor 410 to operate in accordance with the methods and teachings herein.

The present invention may also be embodied in a handheld or portable device containing a subset of the computer hardware components described above. For example, the handheld device may be configured to contain only the bus 415, the processor 410, and memory 450 and/or 425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 410, a data storage device 425, a bus 415, and memory 450, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 410. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
displaying a series of media objects with a hardware display device, the series containing one or more media objects, wherein each media object in the series is a digital image;
receiving a request to edit a media object;
in response to the request, creating a new copy of the media object and applying the edit to the new copy of the media object;
adding the new, edited copy of the media object to the series of media objects as a current media object;
editing a selected media object other than the current media object in response to an edit request;
starting a new parallel fork from the selected media object;
automatically generating a series of edits in the new parallel fork that start from the edited selected media object; and
adding multiple copies of the media object to the new parallel fork, each copy having one of the range of edits applied to the copy of the media object and corresponding to the series of edits that start from the edited selected media object and end at an original image.

2. The method of claim 1, wherein the series of media objects comprise a stack.

3. The method of claim 1, further comprising:
deleting a media object in the series of media objects; and
purging the edit associated with the deleted media object from the series of media objects.

4. The method of claim 1, further comprising:
simultaneously displaying the media object and the edited new copy of the media object in the series.

5. The method of claim 1, wherein applying the range of edits to the media object further comprises:
applying a spectrum multi-edit that adds multiple copies of the current media object to the series, each copy having a filter of a different strength applied to the copy of the current media object.

6. The method of claim 1, wherein applying the range of edits to the media object further comprises:
applying a texture multi-edit that adds multiple copies of the current media object to the series, each copy having a different texture applied to the copy of the current media object.

7. The method of claim 1, further comprising:
applying a range of edits to the current media object in response to a single multi-edit request, each of the range of edits to perform a different edit on the current media object.

8. The method of claim 7, further comprising:
adding multiple copies of the current media object to the series, each copy having one of the range of edits applied to the copy of the current media object.

9. A server with a hardware memory that stores an edit logic designed to provide a series of copies of a media object reflecting successive edits, the edit logic comprising:
a copy logic to generate a new editable copy of the media object in response to an edit request to be performed on the media object, wherein the each media object is a digital image;
an editing logic to apply edits to the new editable copy of the media object;
a display logic to add the new editable copy of the media object with the applied edits to the series, designate the new editable copy of the media object as a current version, and display the series on a display device coupled with the edit logic; and
a forking logic to start a new editing fork if a user edits a selected media object prior to the current version of the media object, automatically generate a series of edits in the new editing fork that starts from the selected media object prior, and add a series of media objects, edited by the automatically generated series of edits, to the new editing fork, each edit in the automatically generated series an edit that has already been performed in a corresponding series of edits between the selected media object and the current media object, wherein the new editing fork of media objects is displayed by the display logic with the series of media objects.

10. The edit logic of claim 9, wherein the current version of the media object includes successive edits of each of the media object copies in the series.

11. The edit logic of claim 9, further comprising:
stacking logic to maintain a stack configuration for the series of copies of the media object.

12. The edit logic of claim 9, further comprising:
a delete logic to enable the user to delete one or more media objects from the series.

13. The edit logic of claim 12, further comprising:
a purge logic to delete an edit associated with the deleted one or more media objects from forward media objects in the series.

14. The edit logic of claim 9, further comprising a user interface to enable a user to enter edits, and delete edits and media objects.

15. The edit logic of claim 9, wherein the display logic is further to simultaneously display the original media object and the editable copy of the media object.

16. The edit logic of claim 9, further comprising:
a multi-edit logic to automatically generate multiple copies of a selected media object, each of the copies of the selected media object with a different edit applied, in response to a single multi-edit request of the selected media object.

17. A web server, accessible via a web browser, the web server providing image editing capabilities through an edit logic stored in a hardware memory of the web server, the edit logic comprising:
hardware memory to store at least one image;
a copy logic to create a new copy of an image, from the at least one image stored in the memory, in response to an edit request to be performed on the image;
an editing logic to enable a user to apply one or more edits to the new copy of the image
a display logic to display the at least one image, the multiple copies of the image and the new copy of the image including the one or more edits to the user; and
a forking logic to start a new editing fork if a user edits a selected media object prior to the current version of the media object, automatically generate a series of edits in the new editing fork that starts from the selected media object prior, and add a series of media objects, edited by the automatically generated series of edits, to the new editing fork, each edit in the automatically generated series an edit that has already been performed in a corresponding series of edits between the selected media object and the current media object, wherein the new editing fork of media objects is displayed by the display logic with the series of media objects.

18. The edit logic of claim 17, further comprising:
a stacking logic to display the at least one image and the new copy of the image including the one or more edits in a stack, such that a portion of each image is simultaneously visible to the user.

19. The edit logic of claim 18, wherein a most recently edited copy of the image is shown as a top image in the stack, and previously edited copies of the image are partially visible as well.

20. The edit logic of claim 17 further comprising:
a multi-edit logic to automatically generate multiple copies of a selected image, each copy with a different edit applied, in response to a single multi-edit request of the selected image.

* * * * *